Figure 1:
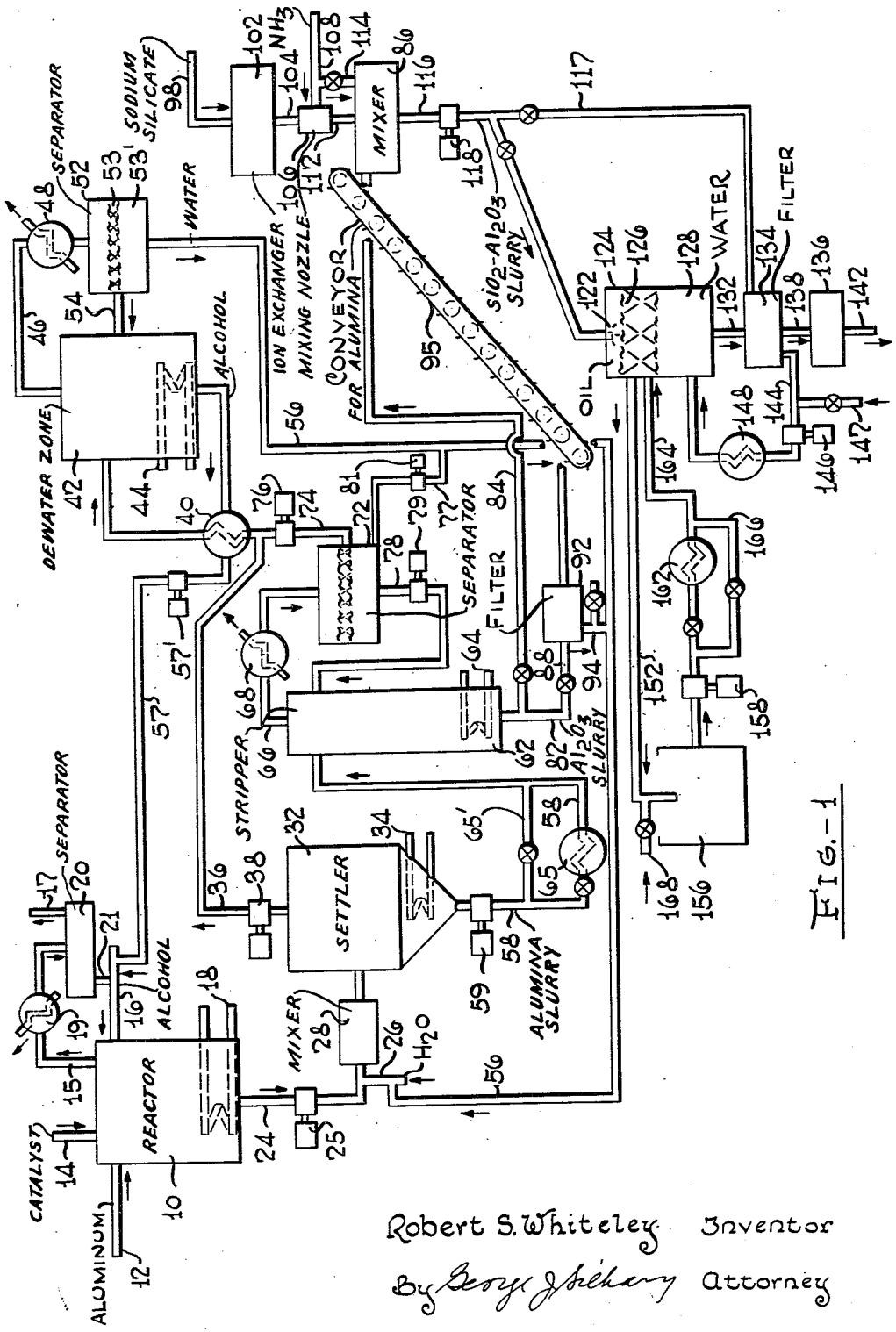

March 12, 1957 R. S. WHITELEY 2,785,140
METHODS OF MAKING SILICA-ALUMINA CATALYSTS
Filed March 29, 1951 2 Sheets-Sheet 1

Robert S. Whiteley Inventor
By George J. Stehney Attorney

United States Patent Office 2,785,140
Patented Mar. 12, 1957

2,785,140

METHODS OF MAKING SILICA-ALUMINA CATALYSTS

Robert S. Whiteley, Baton Rouge, La., assignor to Esso Research and Engineering Company, a corporation of Delaware Application March 29, 1951, Serial No. 218,110

1 Claim. (Cl. 252—455)

This invention relates to an improved method for the manufacture of conversion catalysts and more particularly relates to the manufacture of synthetic silica-alumina catalysts adapted for use as hydrocarbon cracking catalysts.

Various methods of preparing silica-alumina catalysts are known but the present process produces catalysts which are cheaper and of more uniform quality than catalysts produced by known methods.

Figure 2:
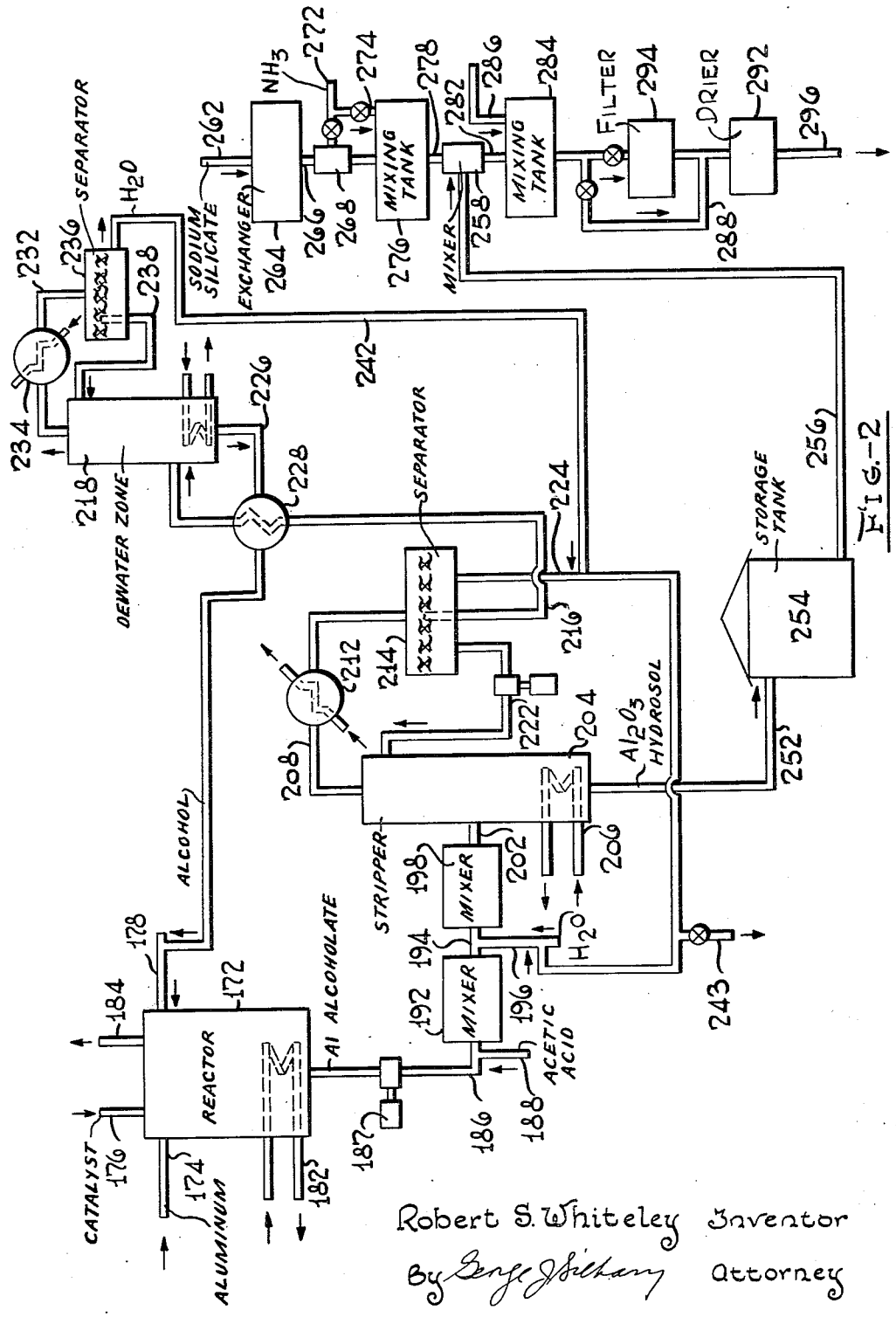

In the drawings:

Fig. 1 represents one form of apparatus for carrying out the preferred form of the present invention using an alumina slurry as the alumina component; and Fig. 2 represents a modification of the process wherein the alumina component is used as alumina hydrosol.

Known processes involve the formation of silica hydrosol by the reaction of sodium silicate and sulfuric acid. After the silica hydrosol is allowed to set to a hydrogel, aluminum sulfate or alum is admixed with the hydrogel and then converted to aluminum hydroxide by the addition of aqueous ammonia. In one known process the silica hydrogel is washed free of sodium sulfate prior to the addition of the alum, while in another, the alum is added before any washing is accomplished. But in both processes washing of the catalyst is necessary. All three of the above steps in the manufacture of a cracking catalyst are expensive and time consuming. A large investment in machinery is required and the corresponding building floor space is large in comparison. The routine maintenance cost, taxes and insurance on the machinery increase in proportion to the initial equipment cost. In addition, the yield of silica and alumina from the raw materials used is lower than is desired. For example, in two known processes the losses are:

| | Process No. 1 | Process No. 2 |
|---|---|---|
| | Percent | Percent |
| Alumina input | 100 | 100 |
| Alumina output, percent of input | 61 | 92 |
| Alumina loss, percent of input | 39 | 8 |
| Silica input | 100 | 100 |
| Silica output, percent of input | 85 | 93 |
| Silica loss, percent of input | 15 | 7 |

In the above processes, the raw materials used are sodium silicate, sulfuric acid, aluminum hydrate and ammonia. Sufficient storage for securing uninterrupted operation of the plant is necessary for each of the above named ingredients. Usually from 7 to 14 days of storage of raw materials is provided.

In the preferred form of my process described in connection with Fig. 1, pure silica hydrosol and pure alumina are made independently. The silica hydrosol is set to a hydrogel by a technique which has been carefully avoided in previous processes which use silica hydrosol. I set the silica hydrosol to a hydrogel and simultaneously disperse the hydrogel into a pumpable slurry. I then add the alumina while keeping the hydrogel well agitated and form a homogeneous slurry of intimately mixed silica hydrogel and alumina hydrogel. I then dry the mixture into a finished catalyst. In the preferred example the mixture is formed into particles of essentially spherical shape, the product consisting of some true spherical particles and some spheroidal particles. A product of equal utility in the conversion of petroleum fraction to useful cracked products is formed by drying the mixed hydrogels and then grinding the particles to the desired size. The preferred size is between about 5 and 200 microns with the majority of particles being between about 20 and 120 microns. I do not use any washing equipment.

For a 90,000 pound per calendar day plant, the cubic space of the building housing the silica and alumina preparation equipment is about 15 to 20% of that used by the two processes mentioned above. The recovery of silica and alumina is better than 95% of the input. I maintain the same storage capacity for raw materials as in other plants, namely 7 to 14 days of each material, but the overall cost of the storage equipment would be much less in a plant employing my process because (1) better utilization of the raw materials is secured and (2) large expensive pressure vessels, such as are required for the storage of ammonia, are not necessary. A small quantity of ammonia is used in my process but the quantity is very small compared to that used by the other processes. For example, for a 45 tons per calendar day plant I would use about 0.5 ton/C. D. to 2 tons/C. D. of ammonia. The other processes use between 7.5 tons/C. D. and 10 tons/C. D. of ammonia for a plant of similar capacity.

In accordance with the preferred form of my invention (Fig. 1) the silica alumina catalyst is made from silica hydrosol prepared by ionic exchange between commercially available sodium silicate or other alkali silicate and a resin such as Amberlite IR-100, IR-C50 or a mixture of the two resins and alumina prepared by the hydrolysis of aluminum alcoholate.

Referring now to Fig. 1 of the drawings, the reference character 10 designates a reaction vessel into which aluminum metal in the form of shot, ingots, chips, turnings or the like is introduced through line 12 and catalyst such as mercury salts, iodine, an aluminum halide, etc., with mercuric chloride being preferred, is introduced through line 14 into reactor 10. Substantially anhydrous aliphatic alcohols are introduced into reactor 10 through line 16. Water soluble alcohols such as ethyl, isopropyl or tertiary butyl alcohols may be used but the water insoluble alcohols are preferred.

The alcohol is preferably amyl alcohol or Pentasol which is a commercial isomeric mixture of amyl alcohols and available on the open market. Preferably $C_5$ and higher aliphatic alcohols are used which are liquid at the temperature of the operation of the process because they are less soluble in water and more readily recovered for reuse in the process. Mixtures of such aliphatic alcohols may be used. When using $C_5$ aliphatic alcohols alone the reactor is usually maintained at a pressure of about 5 to 25 lbs. per sq. in. by means of a pressure control valve in line 17.

In some cases a selected hydrocarbon or a hydrocarbon fraction such as a petroleum distillate boiling within the range of about 200° to 500° F. or higher may be added to the water insoluble alcohol selected. Selected hydrocarbons such as heptane, octane or octane mixtures may be used in the reactor 10. The addition of the hydrocarbon acts as a diluent and aids in controlling the reaction between the alcohol and the aluminum metal. Also the hydrocarbon greatly aids in the separation and recovery of the alcohol following hydrolysis of the aluminum alcoholate. In addition the hydrocarbon serves as a solvent for the aluminum alcoholate formed during the reaction. When using a mixture of $C_5$ aliphatic alcohol with a pure hydrocarbon, such as heptane, or a petroleum oil fraction, I reduce the quantity of alcohol to about ⅔ the quantity used when alcohol is the only liquid, other than $HgCl_2$, added to the reactor.

It is usually necessary to heat the mixture in reactor 10 to initiate the reaction between the aluminum and the alcohol and one form of heating means such as a steam heating coil 13 is shown in the drawing but other methods of heating may be used. The contents of reactor 10 are heated initially to a temperature of about 200° to 300° F., preferably about 265° F. Steam or other heating means or mediums may be used. After the reaction is well started, the reaction becomes rapid and it is necessary to cool the contents of reactor 10. The cooling may be done by passing a cooling medium through coil 18 instead of a heating medium to prevent the temperature from rising. Preferably the reactor is maintained at a temperature of between about 200° to 300° F. during the reaction. More than one reactor may be used when making large quantities of catalyst to provide a continuous process.

The aluminum metal and alcohol react to form aluminum alcoholate or aluminum alkoxide and hydrogen gas. The hydrogen gas and vapors of alcohol and hydrocarbon, if any hydrocarbon is used, pass overhead through line 15 and reflux condenser 19 from which condensed liquid and hydrogen pass into separator 20. Hydrogen which is substantially pure is vented through line 17 to storage and is separately recovered. A pressure release valve (not shown) may be provided for line 17. The condensate is preferably returned through lines 21 and 16 to reactor 10 and aids in cooling the reactor 10.

The aluminum alcoholate and alcohol liquid mixture is withdrawn from the reactor 10 and passed through line 24 by pump 25 and water is added through line 26 to hydrolyze the alcoholate, the mixture being passed through orifice mixer 28 or other mixing means to thoroughly mix the water and the alcoholate. The mixture of aluminum hydroxide, alcohol, water and hydrocarbon, if used in the reaction, leaving mixer 28 is passed to a settling zone 32 where the alcohol-hydrocarbon mixture forms an upper layer and the water containing the alumina particles as a slurry forms the lower layer. Heating coil 34 or other heating means may be used for heating the contents of settler 32 to a temperature between about 70° and 210° F.

The upper alcohol-hydrocarbon layer is withdrawn through line 36 and passed by pump 38 through indirect heat exchanger 40 to preheat the mixture which is then passed to a dewatering or distilling tower 42 to remove water from an azeotropic mixture or solution of amyl alcohol and water. Heat is supplied to tower 42 by steam heating coil 44 or other heating means to heat the contents of the tower to about 260° to 280° F. Water, alcohol and hydrocarbon vapors pass overhead through line 46 provided with a condenser 48 and the condensate passes to separating tank 52 wherein the alcohol-hydrocarbon mixture settles as an upper layer 53 and water as a lower layer 53'. The alcohol-hydrocarbon mixture is withdrawn and passed through line 54 and returned to dewatering tower 42. Water is withdrawn through line 56 and passed in line 26 for recycling to the hydrolyzing zone 28. The dewatered alcohol-hydrocarbon mixture is withdrawn from the bottom of tower 42 through indirect heat exchanger 40 and line 57 by pump 57' and returned to line 16 for reuse in the process. In passing through heat exchanger 40, the alcohol containing liquid passing to line 16 is cooled and the mixture passing through line 36 to tower 42 is preheated.

Alumina particles in water suspension are withdrawn from the bottom of settling zone 32 as a slurry through line 58 by pump 59 and passed to the upper portion of a stripping tower 62 provided with a steam heating coil 64 or other heating means to heat the contents of a stripping tower 62 to about 200° to 220° F. Stripping tower 62 may be a baffled or packed tower. Line 58 may be provided with a heater 65. A by-pass line 65' is provided around heater 65. In the tower 62 the alcohol-hydrocarbon constituents are separated from most of the water by passing overhead as vapors through line 66 but some water vapor is carried over at the same time. Line 66 is provided with a condenser 68 for condensing the vapors and the condensate is passed to separator 72 wherein the alcohol-hydrocarbon mixture settles as an upper layer and the water as a lower layer. The alcohol-hydrocarbon layer is withdrawn and passed through line 74 by pump 76 and returned to dewatering tower 42 via indirect heat exchanger 40. At least a portion of the water is withdrawn from the bottom of separator 72 and passed through line 78 by pump 79 to the upper portion of the stripping tower 62. If desired, some of the water may be withdrawn from vessel 72 through line 77 by means of pump 81 and returned to the hydrolyzing zone 28 by means of line 56.

The slurry of alumina in water, containing between about 3% and 25% by weight of $Al_2O_3$ is withdrawn from the bottom of stripping tower 62 through line 82 and may be passed as a slurry through line 84 to an agitating vessel 86 presently to be described or it may be passed through line 88 and filter 92 to remove a portion of the water which may be removed from the system at 94. A part or all of the water removed through line 94 may be returned via line 56 for reuse to hydrolyzing zone 28. The alumina particles in the filter cake are then discharged on to a belt or screw conveyor or other type conveyor 95 and transferred to vessel 86.

The silica hydrosol is preferably made by percolating or contacting sodium silicate or other alkali metal silicate with an ion exchange resin bed or the like. The acid regenerated organic cation exchange material is well known and may be made from sulfuric acid-treated coal, wood, waste petroleum sludge or lignite, or from various synthetic resins of the polyhydric phenol-formaldehyde, tannin-formaldehyde type and phenol sulfonic acid-formaldehyde type. The resins may be purchased on the open market as Amberlite IR-100, IR-120 or IR-C50 for example.

The concentration of the sodium silicate should be below about 225 gm. $SiO_2$ per liter and preferably above 29 grams of $SiO_2$ per liter. At above about 225 gms. $SiO_2$ per liter of sodium silicate feed, the solution becomes viscous and the ion exchange resin is not sufficiently efficient in the removal of sodium. The process is not economical below about 29 gms. of $SiO_2$ per liter of sodium silicate feed. The length of the ion exchange step depends upon the type of resin, the quantity of sodium in the sodium silicate feed, the quantity of resin in the ion exchange vessel and the quantity of soda which can be tolerated in the product.

In general, the feed of sodium silicate is discontinued when the pH of the product exceeds a predetermined value. The exact value of this pH depends somewhat on the source and purity of the silicate. For example, when using one source of commercially available silicate, the feed to the ion exchanger was discontinued when the pH of the product reached 3. The final pH could be somewhat nearer to 7 when using a chemically pure sodium silicate in the feed stream. The ion exchange resin bed is then regenerated by passing a dilute solution of sulfuric acid or hydrochloric acid through the bed and then rinsing out the acid with water. Preferably, before the acid regeneration step, the resin bed is rinsed with water to remove residual silica hydrosol from the resin bed and this rinse water may be used to dilute the sodium silicate being fed to the ion exchange step. It will be understood that more than one ion exchange resin bed will be used so that while one bed is being used for the exchange step, other resin beds will be going through the other steps in the cycle.

It will be further understood that two of the above named resins can be used in the same exchanger one above the other. Also it is possible to carry out the exchange, washing and regeneration with the solution flowing either downward or upward through the resin bed. In a single cycle, some of the solutions or liquids may be caused to flow downward through the exchanger and others upward through the exchanger. For example, in one case a bed of Amberlite IR-C50 was superimposed upon a bed of Amberlite IR-120. The sodium silicate and subsequent wash water were caused to flow down through the exchanger. The regeneration solution and final rinse water were caused to flow upward through the exchanger. Thereafter the liquid in the exchanger was drained downward until the liquid remaining in the exchange vessel just covered the level of the resin bed.

Although the solutions or liquids are described as entering and leaving the bed, respectively, through common intake lines and discharge lines, the regeneration or other upward flowing solutions may be removed through lines attached to holes in the side of the exchange vessel. This is particularly true in the above-mentioned case in which the regeneration solution and final rinse water were caused to flow upward through the exchange vessel. By drawing the solutions from the side of the vessel just above the resin bed level it is not necessary to completely fill the exchanger with solutions. Before the next succeeding operation is started, any solution above the bed level should be drained down to the level of the top of the resin bed. By withdrawing the effluent solution from a point on the side of the vessel just above the resin bed there is less solution remaining in the exchange vessel after a given operation and the time required between exchanging steps is reduced to correspond to the reduction in draining time.

While a single exchanger has been described, in a large plant it may be necessary to carry out the same operation in several of the exchangers simultaneously. In some cases it may be desirable to use more than one vessel in a single exchange operation and pass the solution through the multiplicity of vessels in series in the same manner as if a single exchange vessel was being used.

The diluted sodium silicate containing between about 29 and 225 gm. of $SiO_2$ per liter is passed through line 98 into ion exchange resin drum 102 and silica hydrosol withdrawn has a concentration of about between 3% and 20% $SiO_2$ by weight. The silica hydrosol having a pH such that it will not set to a hydrogel for a matter of one hour or more is withdrawn from drum 102 through line 104 and passed to a mixing nozzle 106 where ammonium hydroxide or anhydrous ammonia is added through line 108 in sufficient amount to raise the pH of the silica hydrosol to a value at which it will set to a hydrogel in a time which varies between a few seconds and 5 minutes.

There is a critical pH in the range of between about 4 and 7 pH at which silica hydrosol will form a hydrogel in a time which varies between a few seconds and about 5 minutes. When the pH of the silica hydrosol is raised to above 8, the gelation time of the hydrosol becomes a matter of hours and even days at some silica concentrations. I use this peculiar property of silica hydrosol to set quickly under controlled pH conditions to aid in producing an excellent cracking catalyst. The silica hydrosol and ammonium hydroxide are discharged from nozzle 106 through line 112 into the agitated vessel 86 wherein the mixture is kept well agitated. Vessel 86 is filled about ⅔ full. The stream of silica hydrosol is then caused to flow into another agitation tank (not shown) having exactly the same dimensions as vessel 86.

The contents of vessel 86 are then agitated until all the silica hydrosol particles are set to hydrogen particles. Agitating the silica hydrogel while it is being formed provides a means of forming a pumpable slurry as compared to a mass of homogeneous soft gel which would be difficult to rehandle. Such a mass gel would be obtained if agitation was not used. After all the silica hydrosol has been converted to hydrogel, a calculated quantity of alumina slurry is then added through line 84 to the contents of vessel 86. Agitation of the contents of vessel 86 is continued until the alumina and silica are thoroughly mixed.

The agitating device in vessel 86 may be a vertical, centrally located power driven shaft with one or more arms attached to and extending horizontally from the central shaft. The horizontal arms may have the leading faces set at an angle to the vertical plane. I have described one type of agitator but any type which will keep the contents of the vessel well agitated will be satisfactory. In the above description I have described the introduction of all the silica before adding any alumina. I may also carry out this operation stepwise putting in some of the silica, add the desired quantity of alumina for that particular quantity of silica, then add more silica and more alumina alternatively until vessel 86 is full.

While I have mentioned the use of vessel 86 and another similar vessel in the above description, the number of vessels used in this step depends on the size of the manufacturing plant and the time desired for the residence of the silica and alumina in this step before continuing to the next step in the process.

The silica sol leaving the exchanger 102 should not contain more than about 0.5% soda ($Na_2O$), preferably not more than about 0.2% soda calculated on a dry basis.

In one case a silica hydrosol containing 5 wt. % silica and having a pH of about 2.5 was withdrawn from drum 102 through line 104 and passed to mixing nozzle 106 where ammonium hydroxide was added to bring the pH of the silica hydrosol to 5.3. The resulting mixture set to a hydrogel in from about 1 to 3 minutes. Agitation of the hydrosol was maintained continuously during and after the ammonium hydroxide addition and the resulting hydrogel and water mixture could be pumped easily.

Instead of mixing all the ammonium hydroxide with the silica hydrosol in mixing nozzle 106, all or a part of the ammonium hydroxide may be passed through line 114 into agitating vessel 86. The line 114 may also be used to introduce more ammonia or ammonium hydroxide after the addition of the alumina slurry in order to adjust the pH of the mixture to the same pH as the final pH of the silica hydrosol alone. The slurry of silica-hydrogel and alumina is then withdrawn from vessel 86 through line 116 by pump 118 and passed to the spray means 122 at the top of tank 124 containing petroleum oil fraction as an upper layer at a temperature of about 150° to 200° F. In tank 124 there is a lower layer of water 128. The spray means 122 forms small droplets of silica alumina gel particles which fall into the heated oil bath 126 wherein they are aged and kept dispersed as discrete particles having a size between about 2 or 2.5 times the size of the finished catalyst. Other means for making small droplets may be used instead of spraying means 122. The particles may range in size in dried form from microspheres to beads.

The solid gel microspheres or minute spherical particles pass into the water layer 128 maintained at a temperature of about 150° F. to 250° F. in order to separate the oil from the hydrogel particles. The slurry of silica-alumina particles is withdrawn from water layer 128 through line 132 to filter 134 which may be a horizontal or rotary vacuum filter or any other well known type of filter. The filtered particles pass to a drier 136 from line 138 and are withdrawn from drier 136 through line 142. Drier 136 is any tray, tunnel or rotary type which does not distort the spherical shape of the hydrogel before it is dried.

Other methods of drying are possible. Vessel 124 may be by-passed by line 117. Some water is removed from the hydrogel by filter 134. The filter cake is dried in drier 136 after which the catalyst particles are ground to size. Also instead of transferring the hydrogel through line 117 to the filter, the hydrogel may be fed directly to the drier.

The separated water is removed from the filter 134 through line 144 and pumped by pump 146 through a suitable heat exchanger 148 to reheat the water which is returned to the water layer 128 in tank 124. When line 117 is used and vessel 124 is by-passed the filtrate is discarded.

Oil is withdrawn from the oil layer 126 through line 152 and passed to rundown tank 156 from which it is pumped by pump 158 through heat exchanger 162 for reheating the oil and returned through line 164 to layer 126 in tank 124. If desired, all or a part of the oil may be by-passed around heat exchanger 162 by by-pass line 166. Makeup oil may be added at 168.

By varying the proportions of alumina slurry and silica hydrosol introduced into agitating vessel 86, the amount of alumina in the dried silica-alumina catalyst may be varied as desired and may vary between about 5 and 70% by weight with the rest being silica, although between 10% and 50% alumina is the preferred range.

Referring now to Fig. 2 of the drawings there is shown an apparatus for carrying out a process for making silica-alumina catalyst which is more expensive than that above described in connection with Fig. 1 but which also produces improved catalysts. In Fig. 2, the reference character 172 designates a reaction vessel similar to reaction vessel 10 into which aluminum metal is introduced through line 174, catalyst through line 176 and anhydrous alcohol through line 178. A heating coil 182 is preferably provided and a hydrogen outlet 184 is provided. In the form of the invention described in connection with Fig. 2 the anhydrous aluminum alcoholate is peptized with acetic acid or the like before it is hydrolyzed so that an alumina hydrosol is obtained rather than an alumina slurry as is obtained in the method of Fig. 1. Also in the method of Fig. 2 an alcohol alone is used rather than an alcohol-hydrocarbon mixture but it is to be expressly understood that in the method of Fig. 2, an alcohol-hydrocarbon mixture can also be used to form the alcoholate.

The aluminum alcoholate and excess alcohol are withdrawn from vessel 172 through line 186 by pump 187 and a peptizing agent such as glacial acetic acid is added thereto through line 188. The resulting mixture is passed through orifice mixer 192 or other suitable mixer for causing thorough mixing of the constituents of the mixture. More than one orifice mixer may be used and the acetic acid may be added in part or half to the first mixer and the rest or the other half to the second mixer. Or all or part of the acetic acid may be added with the water used in the hydrolysis step presently to be described. The amount of acetic acid introduced may vary between about 1 part of acetic acid to 10 parts of alumina by weight and 2 parts of acetic acid to one of alumina by weight.

The mixture leaves mixer 192 through line 194 and is mixed with water introduced through line 196 and the mixture passed to orifice mixer 198 which functions as a hydrolyzing zone for the alcoholate. Other forms of mixing means may be used. The amount of water used in the hydrolysis step may vary between about 99 parts of water to 1 part of alumina by weight to about 94 parts of water to 6 parts of alumina by weight. The peptizing and hydrolysis steps are carried out at a temperature of about 65 to 220° F. preferably 180° F. The hydrolyzed mixture is then passed through line 202 to stripping tower 204 provided with heating coil 206 which functions in the same manner as stripping tower 62 in Fig. 1 so that only a brief description of this portion of the apparatus will be given. Vapors pass overhead through line 208 through condenser 212 and the condensate passes into drum 214. Separated alcohol is withdrawn through line 216 and passed to dewatering tower 218. Some of the water layer is recycled as reflux through line 222 to tower 204 and the rest recycled through line 224 to line 196 for the hydrolysis step.

Bottoms from dewatering tower 218 comprising dehydrated alcohol pass through line 226 and heat exchanger 228 to line 178 for recycle to tank 172. Overhead from tower 218 passes through line 232 and condenser 234 and condensate to drum 236. Alcohol from the upper layer is recycled through line 238 to tower 218 as reflux and water from the water layer is passed through line 242 to line 196 for the hydrolysis step. Excess water, if any, may be withdrawn through line 243.

Alumina hydrosol containing from about 3% to 25% by weight of $Al_2O_3$ is withdrawn from the bottom of tower 204 through line 252 to storage tank 254 from which it is passed through line 256 to mixing nozzle 258 presently to be described. The stripping tower 204 in Fig. 2 and 66 in Fig. 1 may be used to concentrate the alumina hydrosol.

The preparation of the silica hydrosol is substantially the same as in the method of Fig. 1. Dilute sodium silicate is passed through line 262 into acid regenerated cation exchange resin bed in drum 264 and silica hydrosol is passed through line 266 to mixing nozzle 268 where it is mixed with a sufficient amount of ammonium hydroxide or ammonia to change the pH of the silica hydrosol to between about 4.0 and 7.0 at which the silica hydrosol will form a hydrogel in a time which varies from a few seconds to about 5 minutes. The ammonium hydroxide is added through line 272 but as in Fig. 1, all or part of the ammonium hydroxide or ammonia may be passed through line 274 directly to agitating tank 276.

The small silica hydrogel particles leave tank 276 through line 278 and are mixed in nozzle mixer 258, above referred to, with alumina hydrosol and the two are intimately and thoroughly mixed. The mixture is then passed through line 282 to another agitating tank 284 into which a very small amount of ammonium hydroxide is added through line 287 to set the alumina hydrosol as alumina gel. In tank 284 the mixture is thoroughly agitated until a homogeneous mixture is obtained. Instead of adding the alumina hydrosol to the silica hydrogel and then adding the ammonia, or ammonium hydroxide, it is possible to add the ammonia or ammonium hydroxide to the alumina hydrosol and then add the mixture to the silica hydrogel. The method first described is preferred.

As shown in Fig. 2, the slurry of alumina and silica gel particles is passed from agitating tank 284 through line 288 to a spray drying device 292 to form dry microspheres of silica-alumina catalyst. It is possible to reduce the load on the spray drier by closing the by-pass line 288 around the filter 294 and filtering off some of the water associated with the hydrogel mixture. The partially dry particles are then spray dried in drier 292 and dry particles are withdrawn through line 296. By varying the amounts of silica hydrosol and alumina hydrosol catalysts containing 5 to 70% by weight of alumina may be prepared with the rest being silica.

Any conventional spray drying device may be used. The filter may be either a pressure or vacuum type.

Instead of spray drying in the method of Fig. 2, the oil drying method of Fig. 1 may be used. Also instead of the oil drying method in the Fig. 1 method, the spray drying procedure of the Fig. 2 method may be used.

What is claimed is:

A method of producing silica-alumina catalysts which comprises forming a pure acid silica hydrosol which requires no washing when transformed into the hydrogel and formed by contacting a dilute solution of sodium silicate with an acid regenerated cation exchange resin, raising the pH of the acid silica hydrosol to between about 4 and 7 to hasten gelling thereof, agitating the so-treated silica hydrosol while it is gelling and continuing the agitation until all the silica hydrosol has been converted to silica hydrogel particles and a pumpable slurry is formed, preparing a water slurry of pure alumina by hydrolyzing an aluminum alcoholate with water, then mixing the water slurry of pure alumina with the silica hydrogel slurry, agitating the resulting mixture to thoroughly and intimately mix the silica and alumina and to form silica-alumina particles suspended in the liquid as a pumpable homogeneous slurry, pumping the last-named homogeneous slurry to a partial dewatering step to remove some of the water and to recover partially dry solid silica-alumina particles from the slurry and then spray drying the recovered partially dry silica-alumina particles to form dry spheroidal silica-alumina catalyst particles which require no water washing to remove impurities.

References Cited in the file of this patent
UNITED STATES PATENTS

| | | |
|---|---|---|
| 2,326,706 | Thomas et al. | Aug. 10, 1943 |
| 2,337,421 | Spence et al. | Dec. 21, 1943 |
| 2,356,303 | Connolly | Aug. 22, 1944 |
| 2,457,970 | Bailie | Jan. 4, 1949 |
| 2,555,282 | Ashley | May 29, 1951 |
| 2,582,099 | Braithwaite | Jan. 8, 1952 |
| 2,582,254 | Hunter | Jan. 15, 1952 |